A. SOLOMON.
CLOSURE.
APPLICATION FILED MAR. 11, 1911.
1,074,023.
MODEL.
Patented Sept. 23, 1913.
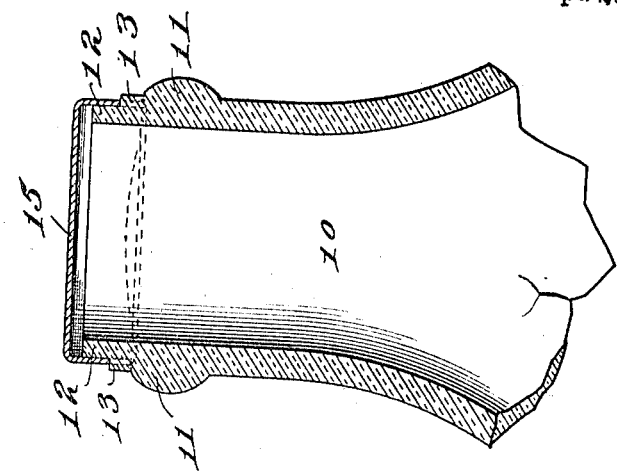
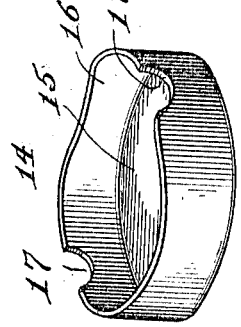
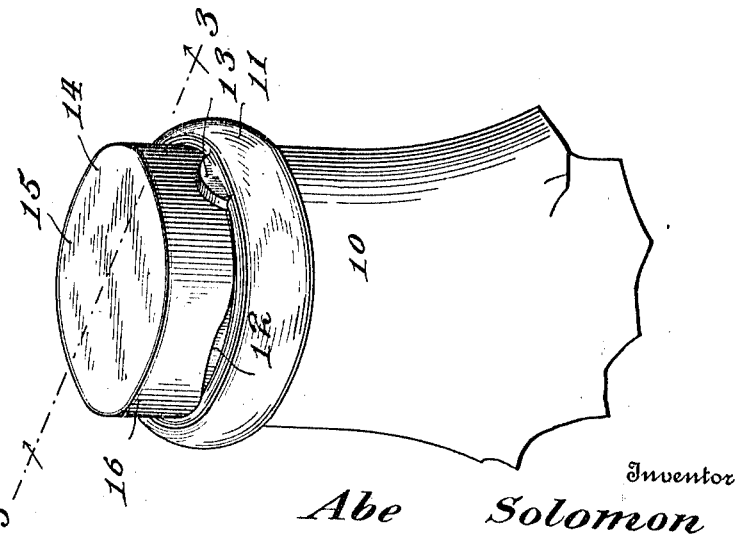
Witnesses
H. H. Lybrand
F. A. Hoster
Inventor
Abe Solomon
By Victor J. Evans
Attorney

UNITED STATES PATENT OFFICE.

ABE SOLOMON, OF ST. LOUIS, MISSOURI.

CLOSURE.

1,074,023.  Specification of Letters Patent.  Patented Sept. 23, 1913.

Application filed March 11, 1911. Serial No. 613,919.

*To all whom it may concern:*

Be it known that I, ABE SOLOMON, a citizen of the United States, residing at St. Louis, State of Missouri, have invented new and useful Improvements in Closures, of which the following is a specification.

The invention relates to closures, and more particularly adapted for milk bottles and like vessels and has for an object to provide a sanitary and efficient means for closing the tops of bottles and the like.

For the purpose mentioned, use is made of a circular body adapted to fit over the top of a vessel provided with a plurality of diametrically opposed integral upwardly extending flanges, the said flanges being adapted to act as hinges for the closure and the said closure having a depending flanged portion so that the closure will closely contact with the outside of the bottle and will not engage the inner edge or pouring side thereof.

In a large number of closures for milk bottles and the like, the said closure when disposed to close the bottle engages the inner pouring edge of the bottle and after a part of the liquid has been poured from the said bottle, a portion of the liquid will remain on the said inner edge and contact with the closure so that in a short time the closure will become moist and sticky and will constitute a breeding place for germs, especially when such closures are applied to milk bottles.

In my device I employ a closure which does not contact with the inner pouring edge of the bottle and the same is so mounted that it can be easily removed from the bottle.

Reference is to be had to the accompanying drawings constituting a part of this specification, in which similar characters of reference denote corresponding parts in all the views, and in which—

Figure 1 is a perspective view disclosing a bottle with my closure attached thereto. Fig. 2 is a perspective view showing my closure in inverted position, and Fig. 3 is a sectional view taken on the line 3—3 of Fig. 1.

Referring more particularly to the views, I employ a vessel 10 provided with an integral peripherally extending flange 11 spaced a distance from the upper edge 12 of the vessel. The upper edge 12 of the vessel 10 is provided with integral flanges 13 extending upwardly from the said edge and relatively opposite to each other.

A closure 14 consisting of a circular portion 15 provided with a laterally extending flange 16 integrally formed with the edge of the portion 15 is adapted for connection with the top of the vessel 10. The flanges 16 of the closure 14 are provided with oppositely disposed indentations 17, said indentations being adapted to receive the flanged portions 13 of the vessel 10 and the closure 14 is attached to the said vessel as shown in Fig. 1.

By referring to Figs. 1 and 2 it will be seen that a portion of the flange 16, on one side of the indentations 17, is made slightly smaller than that portion of the flange on the other side of the indentation 17 so that when the closure is mounted upon the vessel with the flanges 13 received in the indentations 17, the closure can be subjected to a swinging motion.

By applying pressure to an edge of the closure 14 at a point midway between the flanged portions 13 of the vessel 10, the opposite edge of the closure 14 will be lifted from the vessel, the said flanged portions 13 acting as fulcrums for the closure, due to the swinging movement to which the closure can be subjected.

By referring to Fig. 3 of the drawings, it will be seen that my closure in no manner engages the inner pouring edge of the vessel, while at the same time it substantially covers the entire top of the vessel, thus providing a closure that not only completely closes the top of the vessel, but acts as a sanitary covering for the vessel in that the said closure does not contact with the pouring edge of the vessel.

If desirable, the closure 14 can also be removed from the vessel 10 by imparting a turning movement to the closure so as to remove the integral flanges 13 of the vessel from the indentations 17, thus causing the closure to be lifted with respect to the vessel, as will be readily understood by referring to the views.

Having thus fully described the invention, what I claim as new, is:—

In combination with a vessel having an exteriorly arranged peripheral flange formed with the vessel at the upper end thereof, the said vessel being provided with oppositely arranged upwardly projecting flanges formed adjacent the peripheral flange, of a closure consisting of a circular portion having an integral depending flange provided with indentations oppositely opposed and adapted to normally receive the upwardly extending flanges of the vessel therein when the closure is normally seated thereon, a portion of the depending flange of the closure, between the indentations thereof, being reduced to normally lie in spaced relation to the upper end of the vessel adjacent the peripheral flange thereof.

In testimony whereof I affix my signature in presence of two witnesses.

ABE SOLOMON.

Witnesses:
N. SOLOMON,
A. R. SOLOMON.